(12) United States Patent
Ma

(10) Patent No.: US 12,162,345 B2
(45) Date of Patent: Dec. 10, 2024

(54) POWER TRANSMISSION STRUCTURE SUITABLE FOR ALL-TERRAIN KARTS

(71) Applicant: Liang Ma, Shanxi (CN)

(72) Inventor: Liang Ma, Shanxi (CN)

( * ) Notice: Subject to any disclaimer, the term of this patent is extended or adjusted under 35 U.S.C. 154(b) by 0 days.

(21) Appl. No.: 17/799,906

(22) PCT Filed: Nov. 24, 2021

(86) PCT No.: PCT/CN2021/132814
§ 371 (c)(1),
(2) Date: Aug. 15, 2022

(87) PCT Pub. No.: WO2022/127542
PCT Pub. Date: Jun. 23, 2022

(65) Prior Publication Data
US 2023/0066500 A1  Mar. 2, 2023

(30) Foreign Application Priority Data

Dec. 16, 2020 (CN) .......................... 202023035981.3

(51) Int. Cl.
*B60K 17/04* (2006.01)
*B60K 17/24* (2006.01)
*B60B 35/12* (2006.01)
*B60T 17/02* (2006.01)
*F16D 3/06* (2006.01)
*F16H 7/08* (2006.01)

(52) U.S. Cl.
CPC ............. *B60K 17/04* (2013.01); *B60K 17/24* (2013.01); *B60B 35/12* (2013.01); *B60T 17/02* (2013.01); *F16D 3/06* (2013.01); *F16H 7/08* (2013.01)

(58) Field of Classification Search
CPC ........ B60K 17/24; B60K 17/04; B60K 17/22; B60K 2007/0069; B60B 35/12; F16D 3/06; F16H 7/08
See application file for complete search history.

(56) References Cited

U.S. PATENT DOCUMENTS 627,503 A * 6/1899 Humphrey ............. B62D 49/00
    180/373
967,698 A * 8/1910 Wray ................... B60K 17/043
    475/221

(Continued)

FOREIGN PATENT DOCUMENTS

CN  102452276 A  5/2012
CN  203921087 U  11/2014

(Continued)

*Primary Examiner* — Paul N Dickson
*Assistant Examiner* — Matthew D Lee

(57) ABSTRACT

The invention discloses a novel power transmission structure suitable for all-terrain karts, comprising a first sprocket support frame, the upper part of the first sprocket support frame is provided with an upper bearing chock of the support frame, and the lower part is provided with a lower bearing chock of the support frame, the engine end output shaft of the engine is connected to the upper bearing chock of the support frame through a suitable coupling and bearing, the engine end output shaft is equipped with a first sprocket and chain mechanism, and the sprocket of the first sprocket and chain mechanism is installed on the sprocket bearing chock.

5 Claims, 1 Drawing Sheet

(56) References Cited

U.S. PATENT DOCUMENTS

| | | | | |
|---|---|---|---|---|
| 1,059,147 A | * | 4/1913 | Graley | ................ B60K 17/043 |
| | | | | 180/371 |
| 6,286,619 B1 | | 9/2001 | Uchiyama et al. | |
| 2003/0227227 A1 | * | 12/2003 | Tu | ........................... B60K 1/00 |
| | | | | 310/92 |
| 2019/0184822 A1 | * | 6/2019 | Vigen | .................... B60K 17/08 |
| 2021/0129941 A1 | * | 5/2021 | Martino | ................. B62M 17/00 |
| 2021/0213822 A1 | * | 7/2021 | Ripley | .................. B62D 21/10 |

FOREIGN PATENT DOCUMENTS

| | | | | | |
|---|---|---|---|---|---|
| CN | 104827899 | A | | 8/2015 | |
| CN | 108116575 | A | | 6/2018 | |
| CN | 207652970 | U | * | 7/2018 | |
| CN | 210047275 | U | | 2/2020 | |
| CN | 112829579 | A | | 5/2021 | |
| CN | 215042074 | U | | 12/2021 | |
| EP | 1415847 | A1 | * | 5/2004 | ............. B60K 17/24 |

* cited by examiner

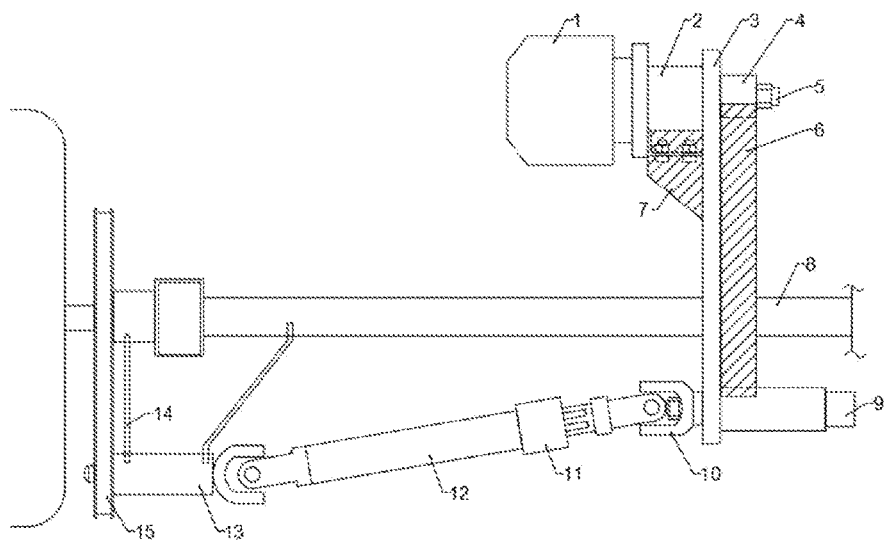

POWER TRANSMISSION STRUCTURE SUITABLE FOR ALL-TERRAIN KARTS

1. TECHNICAL FIELD

The invention relates to the structure of karts, in particular to a novel power transmission structure suitable for all-terrain karts.

2. BACKGROUND ART

At present, all karts and all-terrain vehicles are installed with the engine and rear suspension as an integral rear drive axle, but this driving method cannot better adapt to the off-road, and can not take into account the comfort of the driver and passengers, the reason for this is due to the short size of the above-mentioned vehicle, so the installation position of the engine has been greatly limited, most models design the engine and the rear suspension drive axle as an integral structure, that is, the rear suspension swing arm is a rigid structure, the drive axle is installed under the swing arm, the engine is installed on the swing arm, and the engine and the rear suspension swing arm drive axle are installed and fixed into a rigid single swing arm structure, so that the chain can be effectively used to transmit the power from the engine to the rear drive axle, and the shock-absorbing spring can be effectively used, however, the disadvantage of this design is that since the rear suspension swing arm is an integral rigid structure, the unsprung mass is greatly increased, and the responsiveness of the suspension on the fluctuating road is reduced, and the impact force from the road cannot be effectively alleviated, as the rear suspension swing arm is an integral rigid structure, it cannot form a cross-axis condition with the front axle, when the vehicle is driving on an off-road road, the tracking performance of each wheel is poor, and it cannot drive close to the road in real time, reducing the power transmission efficiency.

Therefore, it is imperative to design a novel power transmission structure suitable for all-terrain karts.

3. SUMMARY OF THE INVENTION

The technical problem to be solved by the invention is that the existing kart structure has low power transmission efficiency due to its deficiencies in structural design, which increases the initial investment cost and maintenance cost, and does not meet the current needs.

In order to solve above technical problem, the invention provides the following technical scheme: a novel power transmission structure suitable for all-terrain karts, comprising a first sprocket support frame, the upper part of the first sprocket support frame is provided with an upper bearing chock of the support frame, and the lower part is provided with a lower bearing chock of the support frame, the engine end output shaft of the engine is connected to the upper bearing chock of the support frame through a suitable coupling and bearing, the engine end output shaft is equipped with a first sprocket and chain mechanism, and the sprocket of the first sprocket and chain mechanism is installed on the sprocket bearing chock, the lower part of the sprocket bearing chock is provided with a triangular support base, which is fixed by bolts;

one end of the lower bearing chock of the support frame is connected with a transmission shaft through a universal joint, a telescopic spline is installed in the middle of the transmission shaft, and the telescopic spline is connected to the spline shaft in the lower bearing chock of the support frame through the universal joint to realize connection and fixation; the other end of the transmission shaft is connected with the rear drive axle sprocket bearing chock through the same universal joint, the rear drive axle sprocket bearing chock is connected to the rear drive axle through a second sprocket support frame, a second sprocket and chain mechanism is connected to the rear drive axle sprocket bearing chock.

Compared with the prior art, the invention has the following advantages: (1) The engine and the drive axle are installed separately, the engine can be installed on the frame, the unsprung mass of the drive axle is reduced, and the springback responsiveness of the drive axle and the comfort of drivers and passengers are improved;

(2) The drive axle and the frame are flexibly connected by parallel four-bar linkage and panhard linkage, the drive axle can fluctuate and jump, and can also form a cross-axis condition with the front axle, the above structure is combined with the structure of the device, so that each wheel has a better fit with the road surface, while ensuring the smooth transmission of the power of the engine to the road surface;

(3) The structure can be matched with the integrated through-frame structure to make the whole vehicle more beautiful; the overall structure is simple and practical, the power output from the engine is efficiently transmitted to the rear drive axle, so that the vehicle can better adapt to off-road driving, and the engine can also be installed on the frame and separated from the drive axle, which reduces the unsprung mass and improves the comfort of the driver and passengers, greatly improves the power transmission efficiency of the kart, and reduces a large amount of costs invested in the early stage and maintenance cost in the later stage, it has good applicability and is easy to promote.

As an improvement, the first sprocket support frame has a suitable length, and the upper bearing chock of the support frame at the upper end is installed on the engine end output shaft and fastened with a nut.

As an improvement, a chain tensioner is installed in the middle of the first sprocket support frame and the first sprocket support frame is kept in a vertical position, and can also be adjusted to a suitable power transmission position, the lower bearing chock of the support frame is welded into a right angle with the first sprocket support frame, and is kept parallel to the rear drive axle, the lower bearing chock of the support frame is installed with the bearing, shaft, corresponding sprocket and universal joint and fastened with bolts, both ends of the transmission shaft are welded with universal joints, there is a telescopic spline sleeve in the middle of the transmission shaft, one end of the transmission shaft is connected with the spline shaft in the lower bearing chock of the support frame through the universal joint, and the other end is also connected with the rear drive axle sprocket bearing chock through the universal joint, and the universal shaft passes through the bearing chock and installs the corresponding sprocket at the end.

As an improvement, the rear drive axle sprocket bearing chock is welded together with the axle tube of the rear drive axle in parallel through the second sprocket support frame and the H-shaped second sprocket and chain mechanism, a certain installation distance shall be kept between the rear drive axle sprocket bearing chock and the rear drive axle, so that there is no interference when the sprocket at the end of the universal shaft and the sprocket on the axle shaft of the rear drive axle rotate.

As an improvement, the rear drive axle is a rigid shaft structure as a whole, and the drive rigid shaft is installed in the drive axle tube, bearings are installed in the bearing chocks at both ends of the drive axle tube to fix the drive rigid shaft, both ends of the drive rigid shaft are provided with spline flanges to install the wheel hubs, and both sides of the drive rigid shaft are welded with flanges to fix the large sprockets and brake discs.

As an improvement, the corresponding sprocket bearing chock, bearing chock support frame, brake pump fixing bracket, brake pump, longitudinal rod seat, lateral rod seat and spring mounting bracket are respectively installed outside the drive axle tube to control the attitude and position of the drive axle in motion.

4. BRIEF DESCRIPTION OF ACCOMPANY DRAWINGS

FIG. 1 is a schematic diagram of the composition of a novel power transmission structure suitable for all-terrain karts.

As shown in the accompanying drawing: 1 engine, 2 sprocket bearing chock, 3 first sprocket and chain mechanism, 4 upper bearing chock of the support frame, 5 engine end output shaft, 6 first sprocket support frame, 7 triangular support base, 8 rear drive axle, 9 lower bearing chock of the support frame, 10 universal joint, 11 transmission shaft, 12 telescopic spline, 13 rear drive axle sprocket bearing chock, 14 second sprocket support frame, 15 second sprocket and chain mechanism.

5. SPECIFIC EMBODIMENT OF THE INVENTION

The invention is further explained in detail in combination with the accompany drawing.

In the specific embodiments of the invention, a novel power transmission structure suitable for all-terrain karts, comprising a first sprocket support frame 6, the upper part of the first sprocket support frame 6 is provided with an upper bearing chock of the support frame 4, and the lower part is provided with a lower bearing chock of the support frame 9, the engine end output shaft 5 of the engine 1 is connected to the upper bearing chock of the support frame 4 through a suitable coupling and bearing, the engine end output shaft 5 is equipped with a first sprocket and chain mechanism 3, and the sprocket of the first sprocket and chain mechanism 3 is installed on the sprocket bearing chock 2, the lower part of the sprocket bearing chock 2 is provided with a triangular support base 7, which is fixed by bolts;

one end of the lower bearing chock of the support frame 9 is connected with a transmission shaft 11 through a universal joint 10, a telescopic spline 12 is installed in the middle of the transmission shaft 11, and the telescopic spline 12 is connected to the spline shaft in the lower bearing chock of the support frame 9 through the universal joint 10 to realize connection and fixation; the other end of the transmission shaft 11 is connected with the rear drive axle sprocket bearing chock 13 through the same universal joint 10, the rear drive axle sprocket bearing chock 13 is connected to the rear drive axle 8 through a second sprocket support frame 14, a second sprocket and chain mechanism 15 is connected to the rear drive axle sprocket bearing chock 13.

The first sprocket support frame 6 has a suitable length, and the upper bearing chock of the support frame 4 at the upper end is installed on the engine end output shaft 5 and fastened with a nut.

A chain tensioner is installed in the middle of the first sprocket support frame 6 and the first sprocket support frame 6 is kept in a vertical position, and can also be adjusted to a suitable power transmission position, the lower bearing chock of the support frame 9 is welded into a right angle with the first sprocket support frame 6, and is kept parallel to the rear drive axle 8, the lower bearing chock of the support frame 9 is installed with the bearing, shaft, corresponding sprocket and universal joint 10 and fastened with bolts, both ends of the transmission shaft 11 are welded with universal joints 10, there is a telescopic spline sleeve in the middle of the transmission shaft 11, one end of the transmission shaft 11 is connected with the spline shaft in the lower bearing chock of the support frame 9 through the universal joint 10, and the other end is also connected with the rear drive axle sprocket bearing chock 13 through the universal joint 10, and the universal shaft 10 passes through the bearing chock and installs the corresponding sprocket at the end.

The rear drive axle sprocket bearing chock 13 is welded together with the axle tube of the rear drive axle 8 in parallel through the second sprocket support frame 14 and the H-shaped second sprocket and chain mechanism 15, a certain installation distance shall be kept between the rear drive axle sprocket bearing chock 13 and the rear drive axle 8, so that there is no interference when the sprocket at the end of the universal shaft 10 and the sprocket on the axle shaft of the rear drive axle 8 rotate.

The rear drive axle 8 is a rigid shaft structure as a whole, and the drive rigid shaft is installed in the drive axle tube, bearings are installed in the bearing chocks at both ends of the drive axle tube to fix the drive rigid shaft, both ends of the drive rigid shaft are provided with spline flanges to install the wheel hubs, and both sides of the drive rigid shaft are welded with flanges to fix the large sprockets and brake discs.

The corresponding sprocket bearing chock, bearing chock support frame, brake pump fixing bracket, brake pump, longitudinal rod seat, lateral rod seat and spring mounting bracket are respectively installed outside the drive axle tube to control the attitude and position of the drive axle in motion.

The working principle of the invention: the power output from the end shaft of the engine transmits the power to the chain through the sprocket mounted on it, and the bearing in the upper bearing chock of the chain support frame is also installed on the end transmission shaft, the function of the entire chain support frame is to maintain the distance between the small sprockets at the upper and lower ends, so that the chain can transmit power smoothly, the small sprocket bearing chock on the end output shaft is connected with the triangular support welded in the middle of the chain support frame by bolts, and the above structure can prevent the upper bearing of the chain support frame from being damaged during the power transmission process of the chain.

The chain transmits the driving force to the small sprocket mounted on the lower bearing chock of the chain support frame, the small sprocket drives the spline shaft, the universal joint and its transmission shaft to rotate at the same time, the telescopic spline in the middle of the transmission shaft can compensate for the drive axle to lengthen or shorten the transmission shaft during the movement process to ensure the normal transmission of power.

The rotating transmission shaft transmits the power to the universal joint and small sprocket installed on the drive axle, the small sprocket drives the chain to transmit the power to the large sprocket of the drive axle, thereby driving the drive rigid shaft to rotate, and simultaneously drives the wheels at both ends of the drive axle to rotate synchronously to transmit the power to the ground.

When the vehicle is running on the undulating road, the relevant components such as the engine and the sprocket supporting frame and the frame remain relatively stationary, the drive axle moves vertically or cross-axis with the vehicle body along with the undulating road, in the transmission system, the telescopic spline of the transmission shaft and universal joints can compensate for the length and angle variables of the drive shaft being elongated or compressed under various working conditions.

The structure adopts the rear-mounted engine and rear axle drive mode, the engine is installed on the rear axle and the upper part of the frame, and the rear drive axle is installed on the lower part of the engine and the frame, the device is installed between the engine and the rear axle, which can effectively transmit the power from the engine to the rear drive axle, and can also satisfy the rear suspension with sufficient shock absorption stroke, greatly relieve the impact force, and can also meet the working conditions of the cross shaft formed by the rear drive axle and the front axle, so that each wheel has a good tracking performance.

The small sprocket is installed on the engine end output shaft, and a bearing chock is installed on the small sprocket, and the upper and lower ends of the chain support frame are welded with bearing chocks, the chain support base has a suitable length, and the upper bearing chock of the support frame is also installed on the engine output shaft and fastened with a nut.

A triangular support base is welded in the middle of the chain support frame, and the bearing chock installed on the sprocket of the engine output shaft is fastened with the nut, a chain tensioner is installed in the middle of the sprocket support frame and the support frame is kept in a vertical position, can also be adjusted to a suitable power transmission position, the lower bearing chock of the chain support frame is welded into a right angle with the support frame, and is kept parallel to the rear drive axle, the lower bearing chock of the support frame is installed with the bearing, shaft, small sprocket and universal joint and fastened with bolts, both ends of the transmission shaft are welded with universal joints, there is a telescopic spline sleeve in the middle of the transmission shaft, one end of the transmission shaft is connected with the spline shaft in the lower bearing chock of the chain support frame through the universal joint, and the other end is also connected with the the small sprocket bearing chock on the drive rear axle through the universal joint, and the universal shaft passes through the bearing chock and installs the small sprocket at the end.

The small sprocket bearing chock on the drive axle is welded together with the axle tube of the drive axle in parallel through the H-shaped sprocket and the support frame, and a certain installation distance shall be kept between the welded small sprocket bearing chock and the drive axle, so that there is no interference when the small sprocket at the end of the universal shaft and the large sprocket on the axle shaft of the drive axle rotate.

The drive axle matched with the device is a rigid shaft structure as a whole, the drive axle does not have an interaxle differential, which has the advantages of large bearing capacity, few moving parts, and long service life, the structural feature is that the drive rigid shaft is installed in the drive axle tube, bearings are installed in the bearing chocks at both ends of the drive axle tube to fix the drive rigid shaft, both ends of the drive rigid shaft are provided with spline flanges to install the wheel hubs, and both sides of the drive rigid shaft are welded with flanges to fix the large sprockets and brake discs.

The small sprocket bearing chock, bearing chock support frame, brake pump fixing bracket, brake pump, longitudinal rod seat, lateral rod seat and spring mounting bracket are respectively installed outside the drive axle tube to control the attitude and position of the drive axle in motion.

In addition, the terms of "first" and "second" are only used for descriptive purposes, and should not be construed as indicating or implying relative importance or implying the number of indicated technical features. Therefore, the features defined with "first" and "second" may expressly or implicitly include one or more of the features, and in the description of the invention, the meaning of "multiple" is two or two above, unless otherwise expressly specifically defined.

In the invention, the terms of "arrange", "link", "connect" and "fix" etc., should be generally understood unless there are specific restrictions or stipulations, for example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

In the invention, the first feature "above" or "below" the second feature may include the first feature and second feature in direct contact, or may include the first feature and second feature not in direct contact but in contact through additional feature between them unless there are specific restrictions or stipulations.

Moreover, the first feature being "on", "above" and "over" the second feature includes the first feature being directly above and obliquely above the second feature, or simply means that the first feature has a higher level than the second feature. The first feature is "under", "below" and "underneath" the second feature includes the first feature is directly below and diagonally below the second feature, or simply means that the first feature has a lower level than the second feature.

In the description of the specification, the reference terms "one embodiment", "some embodiments", "example", "specific example", "some examples" and etc., may refer to that the specific features, structures, materials or characteristics described by combining the embodiment or example are included in at least one embodiment or example. In the specification, schematic statement of above terms does not necessarily refer to the same embodiment or example. In addition, the described specific features, structures, materials, or characteristics may be combined in any one or more embodiments or examples in an appropriate manner.

Without departing from the concept of the invention, any obvious modification and modification should fall within the protection scope of the invention.

What is claimed is:

1. A novel power transmission structure suitable for all-terrain karts, comprising a first sprocket support frame (6), an upper part of the first sprocket support frame (6) is provided with an upper bearing chock of a support frame (4), and a lower part of the first sprocket support frame is provided with a lower bearing chock of a support frame (9), an engine end output shaft (5) of an engine (1) is connected to the upper bearing chock of the support frame (4) through a coupling and bearing, the engine end output shaft (5) is equipped with a first sprocket and chain mechanism (3), and the sprocket of the first sprocket and chain mechanism (3) is installed on a sprocket bearing chock (2), the sprocket bearing chock is independent of the upper and lower bearing chock, the lower part of the sprocket bearing chock (2) is provided with a triangular support base (7), which is fixed by bolts; one end of the lower bearing chock of the support frame (9) is connected with a transmission shaft (11) through a universal joint (10), a telescopic spline (12) is installed in the middle of the transmission shaft (11), and the telescopic spline (12) is connected to a spline shaft in the lower bearing chock of the support frame (9) through the universal joint (10) to realize connection and fixation; the other end of the transmission shaft (11) is connected with a rear drive axle sprocket bearing chock (13) through another universal joint, the rear drive axle sprocket bearing chock (13) is connected to a rear drive axle (8) through a second sprocket support frame (14), a second sprocket and chain mechanism (15) is connected to the rear drive axle sprocket bearing chock (13).

2. A novel power transmission structure suitable for all-terrain karts of claim 1, wherein the upper bearing chock of the support frame (4) is installed on the engine end output shaft (5) and fastened with a nut.

3. A novel power transmission structure suitable for all-terrain karts of claim 1, further comprising a chain tensioner installed in the middle of the first sprocket support frame (6) and the first sprocket support frame (6) is kept in a vertical position, and can also be adjusted to a power transmission position, the lower bearing chock of the support frame (9) is welded into a right angle with the first sprocket support frame (6), the support frame (9) is a different support frame separate from the first and second sprocket support frames, and is kept parallel to the rear drive axle (8), the lower bearing chock of the support frame (9) is installed with a bearing, a shaft, the first sprocket, universal joint (10) and fastened with bolts, both ends of the transmission shaft (11) are welded with universal joints (10), there is a telescopic spline sleeve in the middle of the transmission shaft (11), one end of the transmission shaft (11) is connected with a spline shaft in the lower bearing chock of the support frame (9) through the universal joint (10), and the other end of the transmission shaft (11) is connected with the rear drive axle sprocket bearing chock (13) through the universal joint (10).

4. A novel power transmission structure suitable for all-terrain karts of claim 1, wherein the rear drive axle sprocket bearing chock (13) is welded together with an axle tube of the rear drive axle (8) in parallel through the second sprocket support frame (14) and the second sprocket and chain mechanism (15), a certain installation distance shall be kept between the rear drive axle sprocket bearing chock (13) and the rear drive axle (8), so that there is no interference when a sprocket at the end of a universal shaft (10) and a sprocket on an axle shaft of the rear drive axle (8) rotate.

5. A novel power transmission structure suitable for all-terrain karts of claim 1, wherein the rear drive axle (8) is a rigid shaft structure as a whole, and a drive rigid shaft is installed in a drive axle tube, bearings are installed in the upper and lower bearing chocks at both ends of the drive axle tube to fix the drive rigid shaft, both ends of the drive rigid shaft are provided with spline flanges to install wheel hubs, and both sides of the drive rigid shaft are welded with flanges to fix a large sprockets and brake discs.

* * * * *